(12) United States Patent
Kondo et al.

(10) Patent No.: US 12,312,012 B2
(45) Date of Patent: May 27, 2025

(54) VEHICLE FLOOR STRUCTURE AND METHOD FOR MANUFACTURING VEHICLE

(71) Applicant: TOYOTA JIDOSHA KABUSHIKI KAISHA, Toyota (JP)

(72) Inventors: Nobuyo Kondo, Toyota (JP); Hiroshi Kawaguchi, Okazaki (JP); Yoshihiko Tsuzuki, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 406 days.

(21) Appl. No.: 18/076,850

(22) Filed: Dec. 7, 2022

(65) Prior Publication Data

US 2023/0242185 A1    Aug. 3, 2023

(30) Foreign Application Priority Data

Jan. 31, 2022   (JP) ................. 2022-012962

(51) Int. Cl.
| | |
|---|---|
| *B62D 25/20* | (2006.01) |
| *B32B 3/28* | (2006.01) |
| *B32B 15/04* | (2006.01) |
| *B32B 15/18* | (2006.01) |
| *B62D 29/00* | (2006.01) |
| *C25D 13/12* | (2006.01) |

(52) U.S. Cl.
CPC ............ *B62D 25/2072* (2013.01); *B32B 3/28* (2013.01); *B32B 15/043* (2013.01); *B32B 15/18* (2013.01); *B62D 29/001* (2013.01); *C25D 13/12* (2013.01); *B32B 2250/03* (2013.01); *B32B 2250/40* (2013.01); *B32B 2255/06* (2013.01); *B32B 2255/26* (2013.01); *B32B 2307/714* (2013.01); *B32B 2605/08* (2013.01)

(58) Field of Classification Search
CPC .. B62D 25/20; B62D 25/2072; B62D 29/001; B62D 29/004; B62D 29/005
USPC ... 296/193.07, 204, 901.01, 23.01, 3, 29, 30
See application file for complete search history.

(56) References Cited

U.S. PATENT DOCUMENTS 9,260,133 B2 *   2/2016   Hata .................. B62D 21/11

FOREIGN PATENT DOCUMENTS

| | | |
|---|---|---|
| DE | 60105948 T3 * | 7/2009 |
| JP | 2015-202686 A | 11/2015 |

OTHER PUBLICATIONS

DE60105948 Text (Year: 2009).*

* cited by examiner

*Primary Examiner* — Dennis H Pedder
(74) *Attorney, Agent, or Firm* — Oliff PLC

(57) ABSTRACT

A vehicle floor structure according to an aspect of the present disclosure is a vehicle floor structure including: a floor pan; an upper surface-side reinforcing member joined to an upper surface of the floor pan; and a lower surface-side reinforcing member joined to a lower surface of the floor pan. The floor pan is formed of a resin-coated steel plate, and a resin layer of the resin-coated steel plate is formed on the upper surface thereof but is not formed on the lower surface thereof. The lower surface-side reinforcing member is formed of a resin-coated steel plate, and a resin layer of the resin-coated steel plate is formed on a surface thereof in contact with the floor pan.

10 Claims, 4 Drawing Sheets

VEHICLE FLOOR STRUCTURE AND METHOD FOR MANUFACTURING VEHICLE

CROSS REFERENCE TO RELATED APPLICATIONS

This application is based upon and claims the benefit of priority from Japanese patent application No. 2022-012962, filed on Jan. 31, 2022, the disclosure of which is incorporated herein in its entirety by reference.

BACKGROUND

The present disclosure relates to a vehicle floor structure and a method for manufacturing a vehicle.

As disclosed in Japanese Unexamined Patent Application Publication No. 2015-202686, resin-coated steel plates of which surfaces are coated with a resin layer, and hence which have a rust-prevention property are used in automobiles.

SUMMARY

However, resin-coated steel plates are more expensive than ordinary steel plates, so the parts where resin-coated steel plates are used in automobiles need to be chosen appropriately.

By the way, a vehicle floor structure is composed of a floor pan (also called a "floor panel") and reinforcing members such as a floor cross member and a floor side member joined to the floor pan. Note that since the contact surfaces in the joint (e.g., the surfaces in the joint on which the reinforcing members are in contact with the floor pan) are not electrodeposited, there is a problem that moisture may enter the gap between the contact surfaces of the joint and rust may occur.

Meanwhile, the inventors found that the surface of the floor pan positioned inside the vehicle was corroded by, for example, a snow-melting agent adhering to the occupants' shoes.

In view of these circumstances, the present disclosure provides a vehicle floor structure that can suppress corrosion in the contact surface between a floor pan and upper surface-side and lower surface-side reinforcing members, as well as corrosion of the upper surface in the floor pan caused by a snow-melting agent.

A vehicle floor structure according to an aspect of the present disclosure includes:

a floor pan;

an upper surface-side reinforcing member joined to an upper surface of the floor pan; and a lower surface-side reinforcing member joined to a lower surface of the floor pan, in which the floor pan is formed of a resin-coated steel plate, and a resin layer of the resin-coated steel plate is formed on the upper surface thereof but is not formed on the lower surface thereof, and the lower surface-side reinforcing member is formed of a resin-coated steel plate, and a resin layer of the resin-coated steel plate is formed on a surface thereof in contact with the floor pan.

In the vehicle floor structure according to an aspect of the present disclosure, the floor pan is formed of a resin-coated steel plate, and a resin layer of the resin-coated steel plate is formed on the upper surface thereof but is not formed on the lower surface thereof; and the lower surface-side reinforcing member is formed of a resin-coated steel plate, and a resin layer of the resin-coated steel plate is formed on a surface thereof in contact with the floor pan. Therefore, corrosion on the contact surface between the floor pan and the upper surface-side and lower surface-side reinforcing members can be suppressed, and corrosion of the upper surface in the floor pan caused by a snow-melting agent can also be suppressed.

Note that the resin layer of the resin-coated steel plate of which the floor pan is formed may be formed over the entire upper surface of the floor pan.

A thickness of the resin layer formed on the upper surface of the floor pan may be larger than that of the resin layer formed on the surface in contact with the floor pan in the lower surface-side reinforcing member.

Further, in the resin-coated steel plate of which the lower surface-side reinforcing member is formed, the resin layer may also be formed on a surface thereof opposite to the surface in contact with the floor pan; and a thickness of the resin layer formed on the surface opposite to the surface in contact with the floor pan may be smaller than that of the resin layer formed on the surface in contact with the floor pan.

Further, in the resin-coated steel plate of which the lower surface-side reinforcing member is formed, no resin layer may be formed on a surface thereof opposite to the surface in contact with the floor pan.

The upper surface-side reinforcing member may be formed of a steel plate covered with no resin. With such a structure, production costs can be reduced while corrosion is suppressed.

Each of the upper surface-side and lower surface-side reinforcing members may have a hat-like shape in cross section perpendicular to a longitudinal direction thereof and may be joined to the floor pan at a pair of flange parts extending in the longitudinal direction.

Note that outer peripheries of the pair of flange parts joined to the floor pan may not be coated with any rust-prevention sealer.

Further, overall shapes of the flange parts may be flat.

A method for manufacturing a vehicle according to an aspect of the present disclosure includes electropainting a floor pan together with an upper surface-side reinforcing member and a lower surface-side reinforcing member, the upper surface-side reinforcing member being joined to an upper surface of the floor pan, and the lower surface-side reinforcing member being joined to a lower surface of the floor pan, in which the floor pan is formed of a resin-coated steel plate, and a resin layer of the resin-coated steel plate is formed on the upper surface thereof but is not formed on the lower surface thereof, and the lower surface-side reinforcing member is formed of a resin-coated steel plate, and a resin layer of the resin-coated steel plate is formed on a surface thereof in contact with the floor pan.

In the method for manufacturing a vehicle according to an aspect of the present disclosure, the floor pan is formed of a resin-coated steel plate, and a resin layer of the resin-coated steel plate is formed on the upper surface thereof but is not formed on the lower surface thereof, and the lower surface-side reinforcing member is formed of a resin-coated steel plate, and a resin layer of the resin-coated steel plate is formed on a surface thereof in contact with the floor pan. Therefore, corrosion on the contact surface between the floor pan and upper surface-side and lower surface-side reinforcing members can be suppressed, and corrosion of the upper surface in the floor pan caused by a snow-melting agent can also be suppressed.

According to the present disclosure, it is possible to provide a vehicle floor structure capable of suppressing corrosion in the contact surface between a floor pan and upper surface-side and lower surface-side reinforcing members, and also the corrosion of the upper surface in the floor pan caused by a snow-melting agent.

The above and other objects, features and advantages of the present disclosure will become more fully understood from the detailed description given hereinbelow and the accompanying drawings which are given by way of illustration only, and thus are not to be considered as limiting the present disclosure.

DESCRIPTION OF EMBODIMENTS

Specific embodiments to which the present disclosure is applied will be described hereafter in detail with reference to the drawings. However, the present disclosure is not particularly limited to the following embodiments. Further, the following descriptions and drawings have been simplified as appropriate for clarifying the explanation.

First Embodiment

<Structure of Vehicle Floor Structure>

Figure 1:
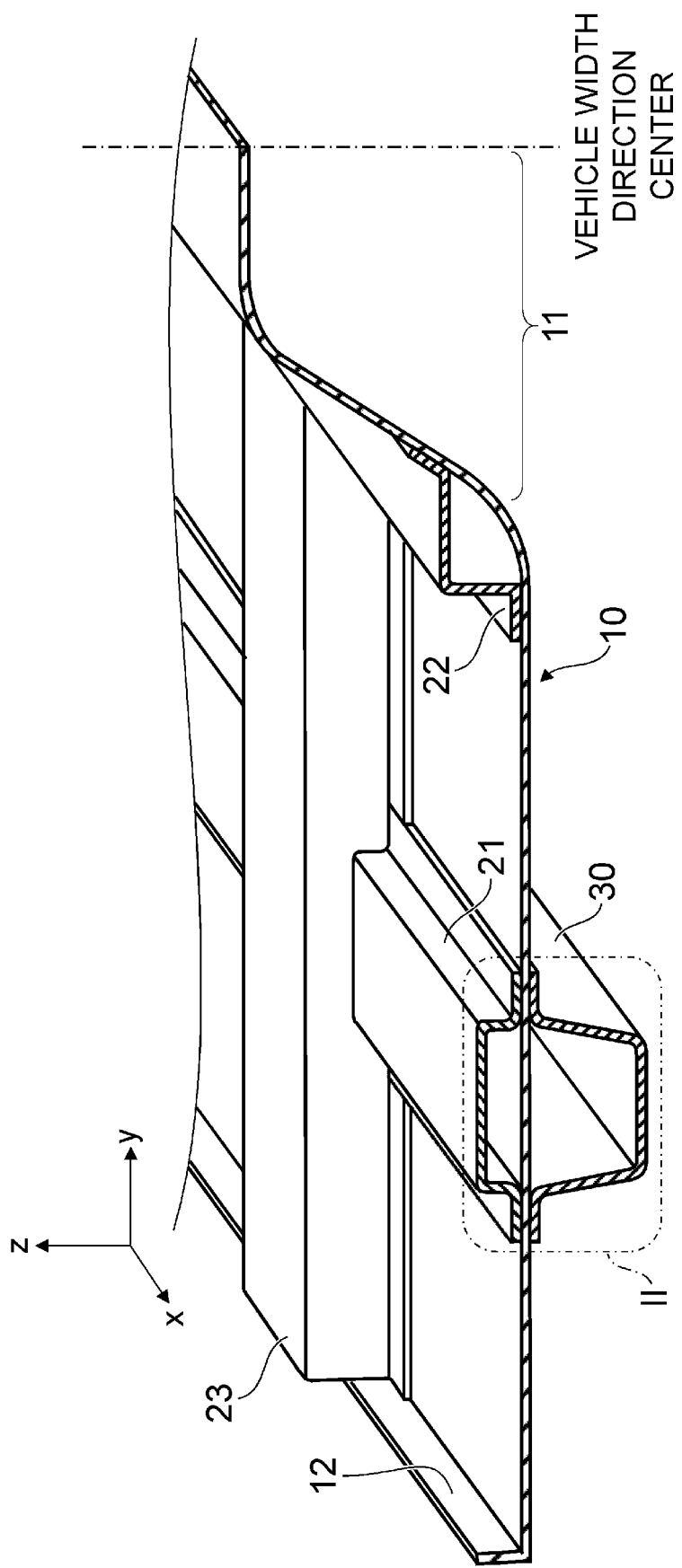
FIG. 1 is a schematic cross-sectional view of a vehicle floor structure according to a first embodiment.

Firstly, a structure of a vehicle floor structure according to a first embodiment will be described with reference to FIG. 1. FIG. 1 is a schematic cross-sectional view of a vehicle floor structure according to the first embodiment. As shown in FIG. 1, the vehicle floor structure according to this embodiment includes a floor pan 10, an upper-side floor side member 21, a tunnel-side frame 22, a floor cross member 23, and a lower-side floor side member 30.

Note that the upper-side floor side member 21, the tunnel-side frame 22, and the floor cross member 23 constitutes an upper surface-side reinforcing member joined to the upper surface (vehicle interior-side surface) of the floor pan 10. Meanwhile, the lower-side floor side member 30 is an upper surface-side reinforcing member joined to the lower surface (vehicle exterior-side surface) of the floor pan 10.

Naturally, the right-handed xyz-orthogonal coordinate system shown in FIG. 1 and other figures are common throughout the drawings, and they are just for convenience in explaining the positional relationships among components. In the example shown in the drawings, the x-axis positive direction indicates the vehicle forward direction; the y-axis direction indicates the vehicle width direction; and the z-axis positive direction indicates the vertical upward direction.

Further, the vehicle floor structure according to this embodiment has a left-right symmetrical structure when viewed from the front of the vehicle (x-axis positive direction), and only the left half of the vehicle floor structure is shown in FIG. 1.

Further, the vehicle floor structure according to this embodiment only needs to include at least one upper surface-side reinforcing member joined to the upper surface of the floor pan 10 and one lower surface-side reinforcing member joined to the lower surface of the floor pan 10. The upper surface-side reinforcing member and lower surface-side reinforcing member are not particularly limited to those shown in FIG. 1.

The floor pan 10 is a plate-like steel plate member that constitutes the main part of the vehicle floor structure. As shown in FIG. 1, the floor pan 10 includes a floor tunnel 11 at the center in the vehicle width direction (y-axis direction), which extends in the vehicle front/rear direction (x-axis direction) and extends upward in a tunnel-like shape from the flat part.

At each of both ends in the vehicle width direction (y-axis direction) of the floor pan 10, a flange part 12 rising upward from the flat part. The flange part 12 is joined, for example, to a side sill (not shown).

The floor pan 10 is press-formed from, for example, one steel plate.

The upper-side floor side member 21 is an upper surface-side reinforcing member joined to the upper surface of the floor pan 10. As shown in FIG. 1, the upper-side floor side member 21 extends, for example, in the vehicle front/rear direction (x-axis direction) in a middle part of the floor pan 10 between the floor tunnel 11 and the flange part 12.

Figure 2:
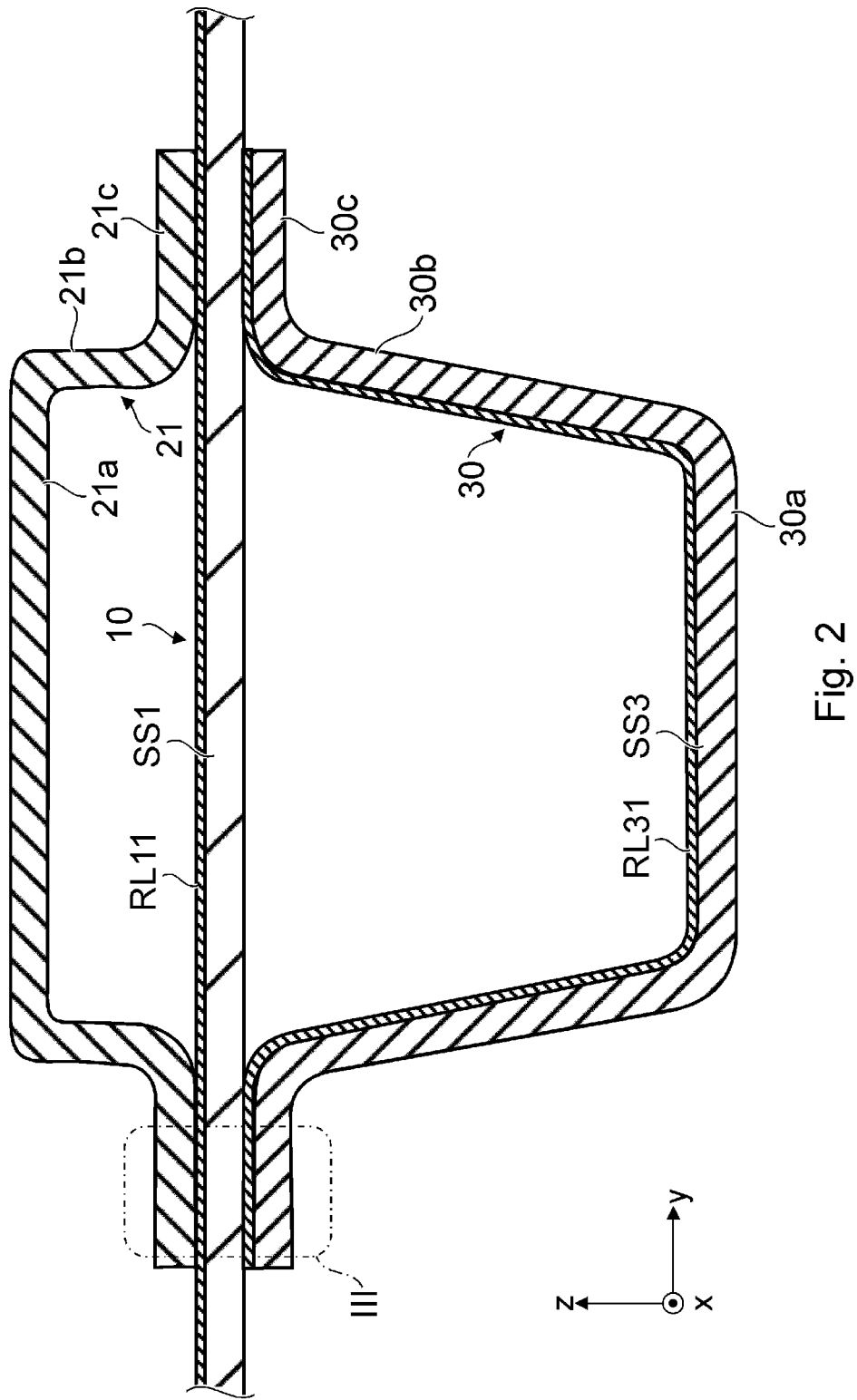
FIG. 2 is a schematic partial cross-sectional view of an area II shown in FIG. 1.

Note that FIG. 2 is a schematic partial cross-sectional view of an area II shown in FIG. 1. As shown in FIG. 2, the upper-side floor side member 21 is a steel plate member having a hat-like shape in cross section perpendicular to the longitudinal direction (x-axis direction). That is, the upper-side floor side member 21 includes a top plate 21a, a pair of sidewalls 21b, and a pair of flange parts 21c.

Note that these parts in the upper-side floor side member 21 have been defined just for explanatory purposes. Further, the structure of the upper-side floor side member 21 is not particularly limited to the examples shown in FIGS. 1 and 2.

More specifically, a pair of sidewalls 21b is formed downward from the end in the width direction (y-axis) of the top plate 21a extending in the vehicle front/rear direction (x-axis direction). Further, a flange part 21c protrudes outward from the lower end of each of the sidewalls 21b. The upper-side floor side member 21 is press-formed from, for example, one steel plate.

As shown in FIG. 2, a pair of flange parts 21c of the upper-side floor side member 21 are joined to the upper surface of the flat part of the floor pan 10 by welding, screwing, etc. The entire flange part 21c is formed in a flat shape, and the upper-side floor side member 21 has a simple structure.

The tunnel-side frame 22 is an upper surface-side reinforcing member joined to the upper surface of the floor pan 10. As shown in FIG. 1, the tunnel-side frame 22 extends in the vehicle front/rear direction (x-axis direction) from the flat part of the floor pan 10 to the sidewall of the floor tunnel 11. That is, the tunnel-side frame 22 reinforces the floor tunnel 11 in the floor pan 10.

More specifically, as shown in FIG. 1, the tunnel-side frame 22 includes an L-shaped main part of which the cross-sectional shape is perpendicular to the longitudinal (x-axis) direction, and a pair of flange parts protruding from both ends in the vehicle width direction (y-axis) of the main part. As shown in FIG. 1, one of the flange parts of the tunnel-side frame 22 is joined to the flat part of the floor pan 10, and the other flange part of the tunnel-side frame 22 is joined to the sidewall of the floor tunnel 11 of the floor pan 10.

The floor cross member 23 is an upper surface-side reinforcing member joined to the upper surface of floor pan 10. As shown in FIG. 1, the floor cross member 23 extends from the flange part 12 of floor pan 10 to the tunnel-side frame 22 in the vehicle width direction (y-axis direction).

More specifically, the floor cross member 23, like the upper-side floor side member 21, is a steel plate member having a hat-like shape in cross section perpendicular to the longitudinal direction (y-axis direction). That is, the floor cross member 23 includes a top plate, a pair of sidewalls, and a pair of flange parts. The flange part of the floor cross member 23 is joined to the upper surface of the main part of the floor pan 10 by welding, screwing, etc. The entire flange part of the floor cross member 23 is formed in a flat shape, and the floor cross member 23 has a simple structure.

The floor cross member 23 is press-formed from, for example, one steel plate.

The lower-side floor side member 30 is a lower surface-side reinforcing member joined to the lower surface of the floor pan 10. As shown in FIG. 1, the lower-side floor side member 30 extends, for example, in the vehicle front/rear direction (x-axis direction) in a middle part of the floor pan 10 between the floor tunnel 11 and the flange part 12. Note that the lower-side floor side member 30 is opposed to the upper-side floor side member 21 with the floor pan 10 interposed therebetween. Note that the lower-side floor side member 30 may be displaced (i.e., shifted) in the vehicle width direction (y-axis direction) with respect to the upper-side floor side member 21.

As shown in FIG. 2, the lower-side floor side member 30 has a shape identical to the vertically-reversed shape of the upper-side floor side member 21, and is a steel plate member having a hat-like shape in cross section perpendicular to the longitudinal direction (x-axis direction). That is, the lower-side floor side member 30 includes a bottom plate 30*a*, a pair of sidewalls 30*b*, and a pair of flange parts 30*c*. Note that the bottom plate 30*a* of the lower-side floor side member 30 corresponds to top plate 21*a* of the upper-side floor side member 21.

More specifically, a pair of sidewalls 30*b* is formed upward from the end in the width direction (y-axis) of the bottom plate 30*a* extending in the vehicle front/rear direction (x-axis). Further, a flange part 30*c* protrudes outward from the upper end of each of the sidewalls 30*b*. The lower-side floor side member 30 is press-formed from, for example, one steel plate.

As shown in FIG. 2, a pair of flange parts 30*c* of the lower-side floor side member 30 are joined to the lower surface of the flat part of the floor pan 10 by welding, screwing, etc. The entire flange part 30*c* is formed in a flat shape, and the lower-side floor side member 30 has a simple structure.

Note that in the vehicle floor structure according to this embodiment, the upper surface-side reinforcing member (upper-side floor side member 21 and the like) is joined to the upper surface of the floor pan 10, and the lower surface-side reinforcing member (lower-side floor side member 30) is joined to the lower surface of the floor pan 10. Then, the floor pan 10 to which the upper surface-side and lower surface-side reinforcing members are joined, i.e., the vehicle floor structure according to this embodiment, is electrodeposited. After electrodeposition, the vehicle floor structure may be further painted, for example, for intermediate and top coatings.

Figure 3:
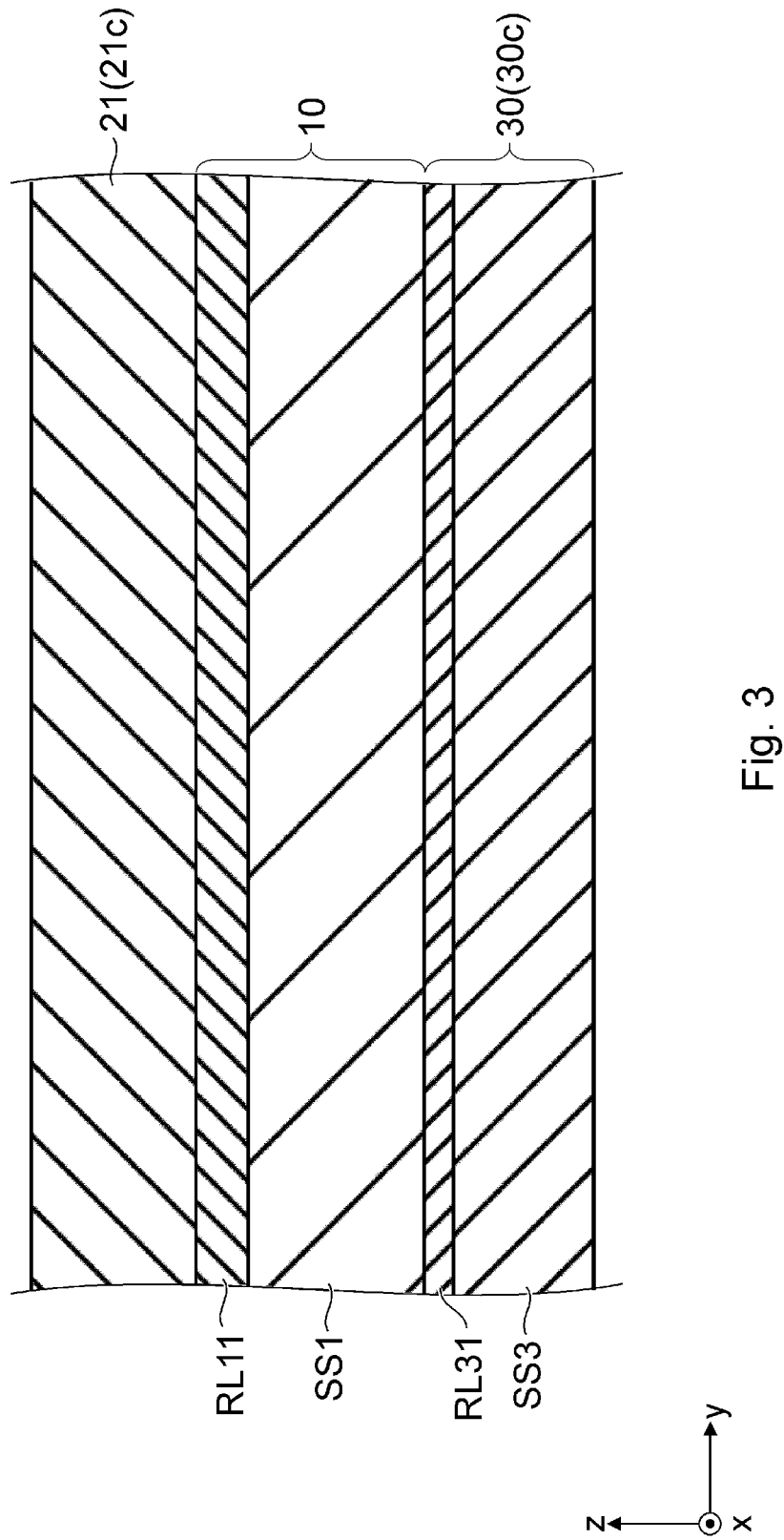
FIG. 3 is a schematic partial cross-sectional view of an area III shown in FIG. 2.

Note that FIG. 3 is a schematic partial cross-sectional view of an area III shown in FIG. 2. As shown in FIGS. 2 and 3, the floor pan 10 is composed of a resin-coated steel plate. In the floor pan 10, the upper surface of a steel plate SS1 is coated by a resin layer RL11, and the lower surface of a steel plate SS1 is not coated by any resin layer. That is, as shown in FIGS. 2 and 3, the resin layer RL11 is formed on the surface of the floor pan 10 in contact with the upper surface-side reinforcing member (upper-side floor side member 21 and the like).

Further, as shown in FIGS. 2 and 3, the lower surface-side reinforcing member (lower-side floor side member 30) is also composed of a resin-coated steel plate. In the lower-side floor side member 30, the upper surface of a steel plate SS3 is coated by a resin layer RL31. That is, as shown in FIGS. 2 and 3, the resin layer RL31 is formed on the surface of the lower-side floor side member 30 in contact with the floor pan 10.

As described above, in the related art, when a floor pan to which upper surface-side and lower surface-side reinforcing members are joined is electrodeposited, the contact surfaces between the upper surface-side and lower surface-side reinforcing members and the floor pan cannot be electrodeposited, and therefore there is a risk of the occurrence of corrosion. Therefore, it was necessary to apply a rust-prevention sealer to the boundary lines between the floor pan and the flange parts of the upper surface-side and lower surface-side reinforcing members. That is, the upper surface-side and lower surface-side reinforcing members are joined to the floor pan at their flange parts, and it was necessary to apply a rust-prevention sealer to the outer peripheries of these flange parts.

In contrast to this, in the vehicle floor structure according to this embodiment, each of the floor pan 10 and the lower surface-side reinforcing member (lower-side floor side member 30) is composed of a resin-coated steel plate as shown in FIG. 2. Note that a resin layer RL11 is formed on the surface of the floor pan 10 in contact with the upper surface-side reinforcing member (upper-side floor side member 21 and the like). Further, a resin layer RL31 is formed on the surface of the lower-side floor side member 30 in contact with the floor pan 10.

Therefore, owing to the resin layer RL11, corrosion causing substances such as water, oxygen, and chlorine hardly reach the steel sheet SS1 of the floor pan 10 and the upper surface-side reinforcing member (upper-side floor side member 21 and the like) which is formed of a steel plate(s). Similarly, owing to the resin layer RL31, corrosion causing substances hardly reach the steel sheet SS1 of the floor pan 10 and the steel sheet SS3 of the lower-side floor side member 30. Therefore, corrosion in the contact surfaces between the upper surface-side reinforcing member (upper-side floor side member 21 and the like) and the floor pan 10, and between the lower-side floor side member 30 and the floor pan 10 can be suppressed.

As a result, there is no need to apply a rust-prevention sealer on the boundary line between the floor pan 10 and the flange part of the upper surface-side reinforcing member (such as flange part 21*c* and the like of the upper-side floor side member 21), i.e., to the outer periphery of the flange part. Similarly, there is no need to apply a rust-prevention sealer on the boundary line between the floor pan 10 and the flange part of the lower surface-side reinforcing member (such as flange part 30c and the like of the lower-side floor side member 30), i.e., to the outer periphery of the flange part.

Further, in the vehicle floor structure in the related art, a flow channel (a joggle structure) was formed inside the flange part of the upper-side floor side member and/or the lower-side floor side member in order to feed an electrodeposition coating solution. In contrast to this, in the vehicle floor structure according to this embodiment, since the floor pan 10 is composed of a resin-coated steel plate, there is no need to provide a joggle structure in the flange part 21c of the upper-side floor side member 21 or the flange part 30c of the lower-side floor side member 30. Therefore, the entire flange part 21c of the upper-side floor side member 21 and the flange part 30c of the lower-side floor side member 30 can be formed in a flat shape. That is, for the structures of the upper-side floor side member 21 and the lower-side floor side member 30 are simplified, and therefore the manufacturing costs can be reduced.

Further, since almost the entire upper surface of the steel plate SS1 in the floor pan 10 is covered by the resin layer RL11, corrosion of the floor pan 10 caused by, for example, a snow-melting agent adhering to the occupants' shoes can also be suppressed.

Note that, as described later, when the resin layers RL11 and RL31 contain a rust-prevention pigment, corrosion can be further suppressed.

Note that the steel plates SS1 and SS3 are composed of, but are not particularly limited to, ordinary steel and steel containing additive elements such as chromium. Further, a plating film may be provided on the surface of the steel plates SS1 and SS3 in order to enhance the rust-prevention property. That is, the steel plates SS1 and SS3 may be plated steel plates. Examples of the plating film include, but are not particularly limited to, a plating film containing any one of metallic elements such as zinc, aluminum, cobalt, tin and nickel, and an alloy plating film containing at least one of these metallic elements.

Further, the resin layer RL11 and RL31 are composed of, but are not particularly limited to, an organic resin such as a water-based coating composition or an organic solvent-based coating composition. Examples of the organic resin include polyurethane resins, polyester resins, epoxy resins, (meth)acrylic resins, polyolefin resins, denatured resins thereof, and mixtures thereof.

The organic resin contains, for example, a rust-prevention pigment and has a rust-prevention property. The rustproof pigment contains, but are not limited to, fine particles of at least one of, for example, a silicate compound, a phosphate compound, a vanadate compound, and a metal oxide. The rustproof pigment is, for example, nanoparticles having a volume-average diameter of about 1 to 50 nm, fine particles having a volume-average diameter of about 0.5 to 10 μm, or a mixture of them. The amount of the rust-prevention pigment added in the resin layers RL1 and RL2 may be, for example, 1 to 40 volume % or 2 to 20 volume %.

Further, the organic resin may contain, for example, a conductive pigment and hence may be conductive. The conductive pigments include, but are not particularly limited to, fine particles of at least one of, for example, a metal, an alloy, conductive carbon, iron phosphide, a carbide, and a semiconductor oxide. The volume-average diameter of the fine particles is, for example, about 0.5 to 10 μm. The amount of the added conductive pigment in the resin layers RL1 and RL2 may be, for example, 1 to 40 volume % or 2 to 20 volume %.

The thickness of the resin layers RL1 and RL2 is, for example, 0.5 to 10 μm. Since the thickness of the resin layers RL1 and RL2 is 0.5 μm or larger, a corrosion resistance can be obtained, and since the thickness of the resin layers RL1 and RL2 is 10 μm or smaller, destruction or delamination of the resin layers RL1 and RL2 can be suppressed during the press forming and the like. The thickness of the resin layers RL1 and RL2 may be, for example, 1 to 5 μm.

Further, the thickness of the resin layers RL11 and RL31 is not limited to any particular values. However, the thickness of the resin layer RL11 formed on the upper surface of the floor pan 10 may be larger than that of the resin layer RL31 formed on the surface of the lower-side floor side member 30 in contact with the floor pan 10. The corrosion of floor pan 10, which would otherwise be caused by a snow-melting agent, can be suppressed more effectively.

Note that in order to improve the adhesion of the resin layer RL11 to the steel plate SS1, the corrosion resistance, and the like, an undercoating film may be provided between the resin layer RL11 and the surface of the steel plate SS1. Further, in order to improve the adhesion of the resin layer RL31 to the steel plate SS3, the corrosion resistance, and the like, an undercoating film may be provided between the resin layer RL31 and the surface of the steel plate SS3. The number of layers and the composition of the undercoating film are not limited to any particular numbers and any particular compositions.

Further, although no resin layer is formed on the end faces of the steel plates SS1 and SS3 in this embodiment, resin layers may be formed on the end faces of the steel plates SS1 and SS3.

As explained above, in the vehicle floor structure according to this embodiment, each of the floor pan 10 and the lower surface-side reinforcing member (lower-side floor side member 30) is composed of a resin-coated steel plate. Note that a resin layer RL11 is formed on the surface of the floor pan 10 in contact with the upper surface-side reinforcing member (upper-side floor side member 21 and the like). Further, a resin layer RL31 is formed on the surface of the lower-side floor side member 30 in contact with the floor pan 10, i.e., the upper surface of the lower-side floor side member 30. Therefore, corrosion in the contact surfaces between the floor pan 10 and the upper surface-side reinforcing member (upper-side floor side member 21 and the like) and the lower surface-side reinforcing member (lower-side floor side member 30) can be suppressed, and corrosion of the upper surface of the floor pan 10 caused by a snow-melting agent can also be suppressed.

Note that the upper surface-side reinforcing member (upper-side floor side member 21 and the like) may be composed of a resin-coated steel plate.

However, as shown in FIG. 2, manufacturing costs can be reduced by forming only each of the floor pan 10 and the lower surface-side reinforcing member from a resin-coated steel plate, and forming the upper surface-side reinforcing member from an ordinary steel plate coated with no resin.

Modified Example

Figure 4:
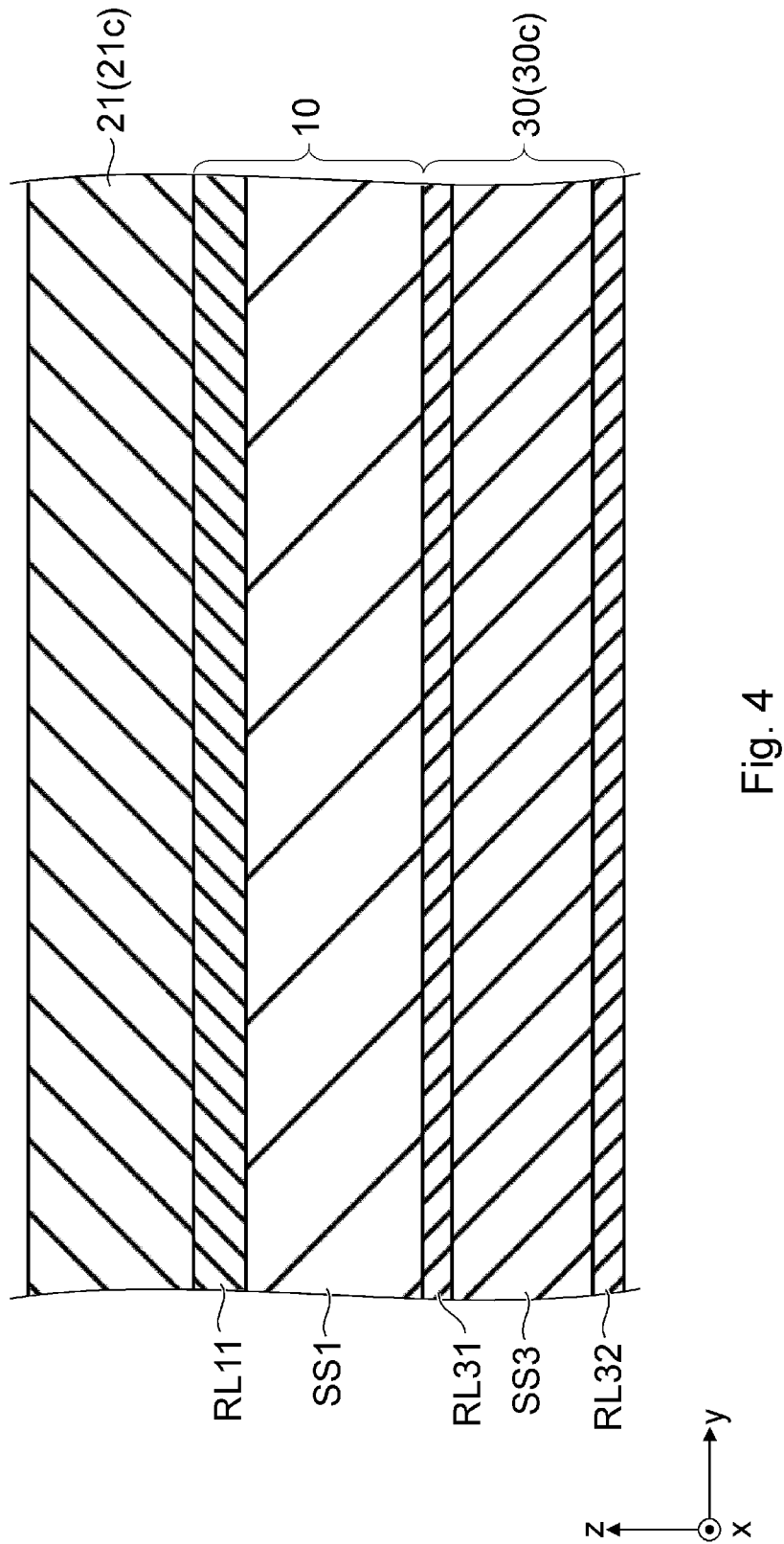
FIG. 4 is a schematic cross-sectional view of a vehicle floor structure according to a modified example of the first embodiment.

Next, with reference to FIG. 4, a structure of a vehicle floor structure according to a modified example of the above-described embodiment will be described. FIG. 4 is a schematic cross-sectional view of a vehicle floor structure according to the modified example of the first embodiment. FIG. 4 is a cross section corresponding to that shown in FIG. 3.

The vehicle floor structure according to this modified example has a structure similar to that of the vehicle floor structure according to the first embodiment shown in FIG. 1.

As shown in FIG. 4, in the vehicle floor structure according to the modified example, the lower surface of the lower surface-side reinforcing member (lower-side floor side member 30) is also coated with a resin layer RL32. In the lower-side floor side member 30 shown in FIG. 4, the upper surface of a steel plate SS3 is coated with a resin layer RL31 and the lower surface of the steel plate SS3 is coated with a resin layer RL32. In other words, the resin layer RL31 is formed on the surface of the lower-side floor side member 30 in contact with the floor pan 10, and the resin layer RL32 is formed on the surface of the lower-side floor side member 30 opposite to the surface thereof in contact with the floor pan 10.

Owing to the resin layer RL32, corrosion of the lower surface of the lower-side floor side member 30 can be suppressed.

The resin layer RL32 is a resin layer similar to the resin layer RL31. The thickness of the resin layer RL32 may be smaller than that of the resin layer RL31, but does not necessarily have to be smaller than that of the resin layer RL31. With such a structure, the manufacturing costs can be reduced.

The rest of the structure is similar to that of the vehicle floor structure according to the first embodiment shown in FIG. 3, so the description thereof is omitted. Note that as shown in FIG. 3, the manufacturing costs can be reduced even further as compared with the modified example by adopting a structure in which only the resin layer RL31 on the upper surface of the lower-side floor side member 30 is formed and the resin layer RL32 on the lower surface thereof is not formed.

From the disclosure thus described, it will be obvious that the embodiments of the disclosure may be varied in many ways. Such variations are not to be regarded as a departure from the spirit and scope of the disclosure, and all such modifications as would be obvious to one skilled in the art are intended for inclusion within the scope of the following claims.

What is claimed is:

1. A vehicle floor structure comprising:
    a floor pan;
    an upper surface-side reinforcing member joined to an upper surface of the floor pan; and
    a lower surface-side reinforcing member joined to a lower surface of the floor pan, wherein
    the floor pan is formed of a resin-coated steel plate, and a resin layer of the resin-coated steel plate is formed on the upper surface thereof but is not formed on the lower surface thereof, and
    the lower surface-side reinforcing member is formed of a resin-coated steel plate, and a resin layer of the resin-coated steel plate is formed on a surface thereof in contact with the floor pan.

2. The vehicle floor structure according to claim 1, wherein the resin layer of the resin-coated steel plate of which the floor pan is formed of is formed over the entire upper surface of the floor pan.

3. The vehicle floor structure according to claim 1, wherein a thickness of the resin layer formed on the upper surface of the floor pan is larger than that of the resin layer formed on the surface in contact with the floor pan in the lower surface-side reinforcing member.

4. The vehicle floor structure according to claim 1, wherein
    in the resin-coated steel plate of which the lower surface-side reinforcing member is formed, the resin layer is also formed on a surface thereof opposite to the surface in contact with the floor pan, and
    a thickness of the resin layer formed on the surface opposite to the surface in contact with the floor pan is smaller than that of the resin layer formed on the surface in contact with the floor pan.

5. The vehicle floor structure according to claim 1, wherein in the resin-coated steel plate of which the lower surface-side reinforcing member is formed, no resin layer is formed on a surface thereof opposite to the surface in contact with the floor pan.

6. The vehicle floor structure according to claim 1, wherein the upper surface-side reinforcing member is formed of a steel plate covered with no resin.

7. The vehicle floor structure according to claim 1, wherein each of the upper surface-side and lower surface-side reinforcing members has a hat-like shape in cross section perpendicular to a longitudinal direction thereof and is joined to the floor pan at a pair of flange parts extending in the longitudinal direction.

8. The vehicle floor structure according to claim 7, wherein outer peripheries of the pair of flange parts joined to the floor pan are not coated with any rust-inhibiting sealer.

9. The vehicle floor structure according to claim 7, wherein overall shapes of the flange parts are flat.

10. A method for manufacturing a vehicle comprising electropainting a floor pan together with an upper surface-side reinforcing member and a lower surface-side reinforcing member, the upper surface-side reinforcing member being joined to an upper surface of the floor pan, and the lower surface-side reinforcing member being joined to a lower surface of the floor pan, wherein
    the floor pan is formed of a resin-coated steel plate, and a resin layer of the resin-coated steel plate is formed on the upper surface thereof but is not formed on the lower surface thereof, and
    the lower surface-side reinforcing member is formed of a resin-coated steel plate, and a resin layer of the resin-coated steel plate is formed on a surface thereof in contact with the floor pan.

* * * * *